Figure 1:
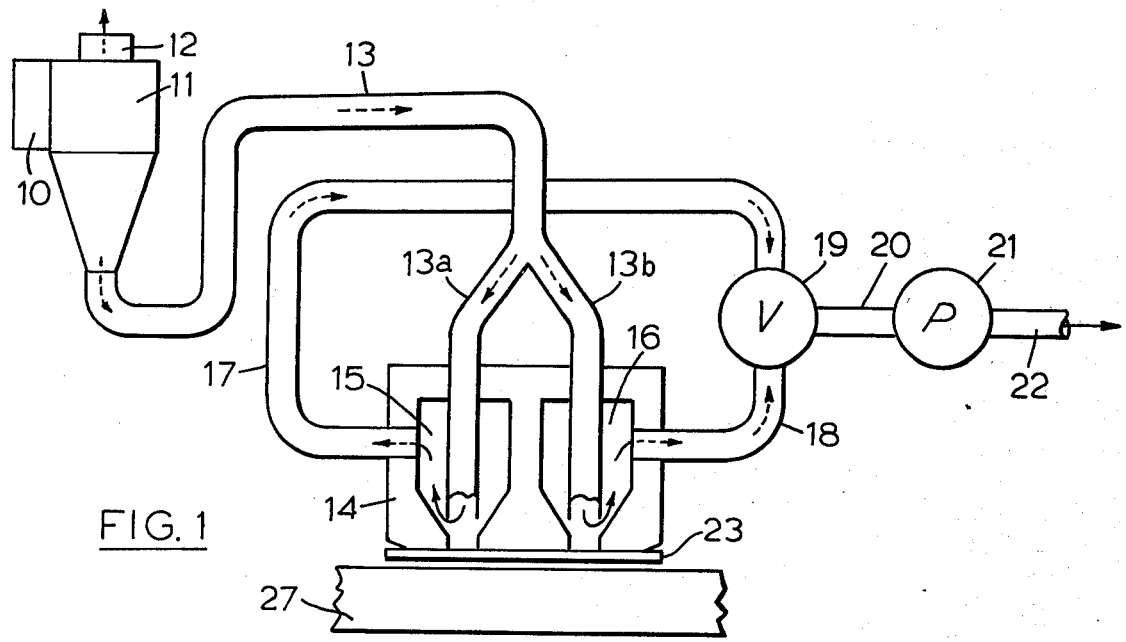

United States Patent [19]

Barringer

[11] 3,970,428
[45] July 20, 1976

[54] METHOD AND APPARATUS FOR COLLECTING ATMOSPHERIC SAMPLES IN ATMOSPHERIC GEOCHEMICAL PROSPECTING

[75] Inventor: Anthony Rene Barringer, Willowdale, Canada

[73] Assignee: Barringer Research Limited, Rexdale, Canada

[22] Filed: Nov. 6, 1975

[21] Appl. No.: 629,264

[30] Foreign Application Priority Data
Nov. 23, 1974 United Kingdom............... 50849/74

[52] U.S. Cl............................ 23/230 EP; 23/232 R; 23/254 R; 73/28; 73/421.5 R
[51] Int. Cl.²......................................... G01N 33/24
[58] Field of Search........ 23/230 EP, 232 R, 254 R; 73/28, 421.5

[56] References Cited
UNITED STATES PATENTS

| | | | |
|---|---|---|---|
| 3,698,871 | 10/1972 | Brennan | 23/232 R X |
| 3,759,617 | 9/1973 | Barringer | 23/230 EP X |
| 3,768,302 | 10/1973 | Barringer | 23/230 EP X |
| 3,868,222 | 2/1975 | Barringer | 23/230 EP |

*Primary Examiner*—Robert M. Reese
*Attorney, Agent, or Firm*—Rogers, Bereskin & Parr

[57] ABSTRACT

Method and apparatus for airborne prospecting in which samples of atmospheric gases, vapors or particulates are collected and contemporaneously the atmosphere near where the samples are collected is monitored to determine whether the respective samples were uplifted by an updraft of air. Samples respectively collected during periods of updrafts are separated from the remainder of said samples, and the samples respectively collected during periods of updrafts are analyzed separately from the remainder of said samples.

10 Claims, 3 Drawing Figures

METHOD AND APPARATUS FOR COLLECTING ATMOSPHERIC SAMPLES IN ATMOSPHERIC GEOCHEMICAL PROSPECTING

This invention relates to atmospheric geochemical prospecting and in particular to a method and apparatus for collecting atmospheric samples of gases, vapours or particles, in an aircraft, vehicle or ship, at relatively low altitudes.

Canadian Pat. Nos. 932,252 and 935,366 of Barringer Research Limited disclose methods and apparatus for collecting, concentrating and analyzing atmospheric particles in the exploration for deposits of minerals and hydrocarbons. As indicated in these patents, the composition of the particles is related to the nature of the underlying terrain. The particles tend to be uplifted by the wind and the action of convection currents of air, as will be explained.

In the lower troposphere and particularly within a few hundred meters of the earth's surface, continual mixing of the atmosphere takes place whereby turbulence caused by wind and convection currents stirs up the air near the earth's surface and causes the mixing of gaseous and particulate material generated at the earth's surface with cleaner air at higher altitudes. Turbulence of wind origin tends to be created by topographic and vegetation irregularities at the earth's surface when air masses impinge against such surface irregularities and form eddies of dimensions that vary in size according to the size of the obstacles. Thus large updrafts will occur when winds strike mountains and relatively localized eddies will occur when winds strike small obstructions such as trees.

In the case of turbulent diffusion related to convection processes, land surfaces invariably show textured patterns of varying heat adsorption and emissivity, and when the surface of the earth is exposed to radiation from the sun, there tends to be differential absorption of thermal energy from place to place and differential re-radiation. As a result of spatially varying thermal re-radiation from the earth's surface, differential heating of the atmosphere close to the surface occurs, thus leading to the formation of thermal plumes. Such thermal plumes which are familiar to any glider pilot exhibit small cross sectional diameters close to the ground but expand in diameter with increasing altitude. Thermal plumes are upward carriers of gases, vapours and particulates generated at the earth's surface, and they are characterized by an increased dust concentration compared with the average dust content of the ambient air. They also frequently contain an increased moisture vapour content since moisture vapour is generated at the earth's surface by evaporation and transpiration of plants.

The formation of thermal plume structures in the climate near the ground is related to various meteorological factors including the presence or absence of sunshine at the earth's surface, the vertical temperature gradient, humidity, wind velocity, etc. The strongest thermal plume conditions occur in the presence of strong sunshine and a super adiabatic temperature lapse rate. Under these conditions thermal plumes rise rapidly with velocities typically of several meters per second and create active thermal turbulence which strongly affects the flight of low flying aircraft. Thermal plumes generated under these conditions will carry gaseous and particulate material aloft to aircraft levels of 60 meters in periods of less than 30 seconds. Thermal plumes tend to travel considerable distance with the wind, and they continuously lift up surface dust into the atmosphere as they traverse the ground.

According to one aspect, the invention consists of collecting samples of atmospheric gases, vapours or particulates and contemporaneously monitoring the atmosphere near where the samples are collected to determine whether the respective samples were uplifted by an updraft of air, separating samples respectively collected during periods of updrafts from the remainder of said samples, and analyzing the samples respectively collected during periods of updrafts separately from the remainder of said samples.

According to another aspect, the invention consists of an apparatus for prospecting for deposits of mineral and hydrocarbon deposits and the like which includes means for receiving samples of atmospheric particulates in an air stream, means for storing the collected particulates on an elongated movable strip whereby they may be stored for subsequent analysis, means for deriving an electronic signal which is responsive in amplitude to a parameter of the atmosphere which is indicative of an updraft condition, and wherein is provided means controllable by said signal for directing particulates collected during the period of an updraft to a portion of said strip which is spaced apart from the positions at which others of said samples respectively are deposited.

The atmospheric samples collected during updraft conditions are considered to be more indicative of the nature of the underlying terrain than the remainder of the samples because they are more likely to have been transported recently from the earth's surface. For example, particles collected during a downdraft may have been in the atmosphere for many hours or even days prior to collection and may thus have been transported considerable distances from the place on the earth's surface where they originated.

In the description below of a preferred embodiment of the invention, particular reference is made to the collection and analysis of atmospheric particles. It will be understood, however, that the invention is applicable also to the collection and analysis of gases or vapours such as methane, ethane, propane, mercury vapour, sulphur dioxide, radon etc. The first three mentioned gases are of particular interest in the field of hydrocarbon exploration.

Figure 2:
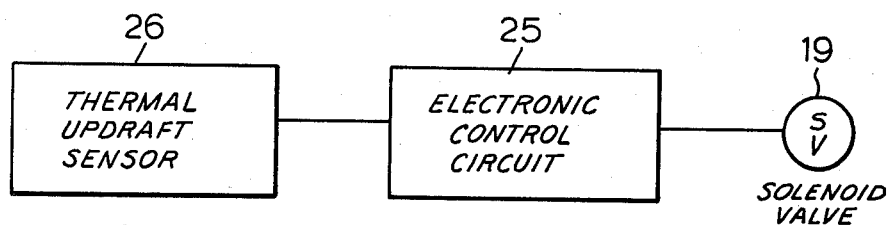
Figure 3:
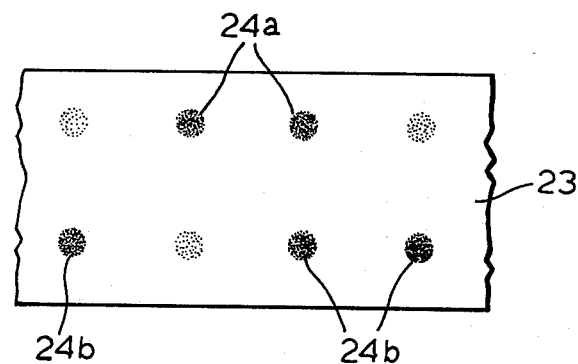

In the drawings, FIG. 1 is a diagrammatic view showing a preferred embodiment of the invention, FIG. 2 is a block diagram of control and other electrical circuits utilized in the embodiment of FIG. 1, and FIG. 3 is a plan view showing a portion of a collection tape used with the embodiment of FIG. 1.

Referring to the drawings, as is described in prior Canadian Pat. Nos. 932,252, 935,366 and 944,667 atmospheric air outside of the aircraft (not shown) is drawn through a pipe 10 and is fed to a concentrator 11 such as a cyclone separator which produces an intense vortex in the incoming air so that particles tend to be flung outwards towards the wall of the cyclone separator, the concentrated particles tending to travel towards the apex of the cyclone separator and the relatively clean air being discharged from the cyclone separator via an axial pipe 12.

A stream of air containing the particles thus concentrated is led via a pipe 13 which branches into two pipes 13a and 13b which in turn terminate in a housing 14 having chambers 15 and 16 which respectively communicate with the pipes 13a and 13b. The chambers 15 and 16 also respectively communicate with pipes 17 and 18 both of which lead to the respective inputs of a two-way solenoid valve 19. The output or downstream end of the solenoid valve 19 is connected via a pipe 20 to a pump 21 which provides suction to either of the pipes 17, 18 and their associated chambers 15 or 16 depending upon the condition of the valve 19. The outlet end of the pump 21 is connected to the atmosphere via a pipe 22.

The lower ends of each of the chambers 15 and 16 taper inwardly and are open ended. The lower surface of the housing 14 is contiguous with a tape 23 of the kind described for example, in Canadian application No. 166,975 of Barringer Research Limited. The tape 23 is supported on a plate 27 and may be disposed on feed and take-up reels (not shown) and moved stepwise or continuously past the housing 14. As shown in FIG. 1, the direction of motion of the tape 23 is at right angles to the plane of the paper. The tape 23 preferably is made of a thin strong non-contaminating synthetic resin such as Mylar which preferably is coated with an adhesive material to facilitate capture on the tape 23 of particles discharged from the chambers 15 and 16 respectively.

The lower ends of the pipes 13a and 13b are open and are positioned near to the open ends of the chambers 15 and 16, and since the tape 23 is supported in close proximity with the lower end of the housing 14, the air emerging from the lower ends of the pipes 13a and 13b respectively is required to change direction through a comparatively sharp angle, as will be clear from FIG. 1.

As a result of the momentum of the particles in the air stream flowing through pipes 13a and 13b respectively, the particles tend to travel in a straight line and hence pass through the open ends of the chambers 15 and 16 and are deposited on the adhesive side of the tape 23. After a suitable collection interval such as five seconds, the tape 23 is transported a short distance and a fresh surface of the tape 23 is exposed to the particles respectively emerging from the chambers 15 and 16.

It will thus be seen that, depending upon the condition of the valve 19, at each incremental station on the tape, particles will be deposited on the tape 23 at one or both of two positions, i.e. the positions on the tape 23 which are aligned with the open ends of the chambers 15 and 16, and the concentration of the particles at each position will depend inter alia upon the length of time that suction was applied to the respective chambers 15 and 16.

Referring to FIG. 3 the positions referred to above are shown diagrammatically as 'dots' or circular areas 24a and 24b respectively with the particulates shown with exaggerated concentration to indicate the locations of the various areas 24a and 24b. The areas 24a represent particulates collected on the tape 23 which have emerged from the chamber 15 and similarly the areas 24b represent particulates collected on the tape 23 which have emerged from the chamber 16. The areas 24a represent particulates collected is still air or during a downdraft.

The valve 19 is controllable by an electrical control signal from an electronic control circuit 25 which in turn is operated by an updraft sensor 26 to be described below. When an updraft is being sensed, a control signal or voltage from the sensor 26 is fed to the control circuit 25 which causes the valve 19 to operate whereby suction from the pump 21 is applied via pipe 18 to the chamber 16. When the control signal ceases, the valve 19 is returned to its other condition whereby suction from the pump 21 is applied to the chamber 15 via the pipe 17. The action of the valve 19 should be quite rapid, as the rise times of the control voltages produced by the sensor 26 may typically be of the order of 20 milliseconds more or less. Many updrafts have periods of less than five seconds and therefore if the tape 23 is held in one position for say five seconds before being transported to its next station, it is possible that in that period of five seconds, the valve 19 may have been switched back and forth several times between the respective positions, thus resulting in the deposition of particles on the tape at both positions 24a and 24b as shown in FIG. 3.

The existence of updrafts may be indicated by one or more of the following parameters either alone or respectively in combination: Temperature, humidity, vertical acceleration, particulate density, conductivity, radon concentration, and vertical atmospheric electric potential gradient.

Under normal temperature lapse conditions in the atmosphere, atmospheric temperature decreases with altitude and consequently any updraft or air however caused will result in movement of higher temperature air into a region of lower temperature air. Updrafts thus can be detected with a suitable thermal sensing device such as the thermistor which is semi-conductor having an electrical resistance which varies as a function of ambient temperature. Well known circuitry may be employed for sensing temperature changes as small as 100th. of a degree with a response time of a fraction of a second. Thus small fluctuations in the atmospheric temperature may be monitored continuously at or near to the entrance to the inlet pipe 10 during airborne traversing.

Particulate concentrations may be measured with sensors which measure light scattering and which also are well known. The concentration of particulates in the atmosphere normally increases in the presence of an updraft at low altitude of the order of 200 feet or less. The correlation between increasing and decreasing particulate concentration and increasing and decreasing atmospheric temperature is particularly indicative of rising air that has picked up particles from the ground. Thus, a preferred control signal for actuating the valve 19 may be derived electronically by multiplying together a first signal which is proportional in amplitude to the concentration of the particulates and a second signal which is proportional in amplitude to the ambient temperature. The peaks of the resultant combination of the first and second signals is used for triggering the valve 19.

An alternative parameter which may be used for the purpose of sensing updraft is humidity. A fast acting humidity sensor such as a Lyman-alpha short wave ultra-violet absorption detector may be used for detecting pockets of humid air arising from the ground surface. An additional parameter related to updrafts is air conductivity. As an approximation, the electrical conductivity of the air is inversely proportional to particulate vertical electrical potential gradient. This gradient is increased substantially by updrafts of air which generally is accompanied by increases in particulate loading of the updraft air. A still further parameter is vertical acceleration. A vertical accelerometer provides a sensitive indicator of updraft conditions and may be used either alone or in conjunction with another of the above parameters such as particulate loading by employing the multiplication technique referred to above with reference to particuate loading or concentration and temperature. Yet another parameter is radon concentration. There is a continuous radon flux from the earth's surface and fluctuations in radon concentration may be sensed to provide an indicator of rising pockets of air.

The invention may be applied not only to explorations carried out over land, but also to explorations carried out over sea, where mechanical turbulence provides comparable vertical mixing updraft conditions. Such updrafts may be sensed by methods similar to those described above.

The invention is applicable not only to aircraft prospecting but also to prospecting carried out in land vehicles and ships where the atmospheric samples may be taken at comparatively low altitudes such as a few feet above the surface of the land or the ocean. Even under such conditions there can be considerable lateral migration of gases, vapours and particulate material.

Finally, although the preferred embodiment of the invention described above refers specifically to particulate collection it will be understood that analagous methods and apparatus may be employed in connection with the collection of gaseous and vapour samples. For example, in order to collect gases and vapours, the sampling tape may be coated with a suitable absorbing material which is capable of entrapping enough of the gas or vapour in question to permit the same to be analyzed. Thus in the case of sampling hydrocarbon vapours such as methane and ethane, a coating of molecular sieve material may be employed on the tape, with the tape being chilled to low temperature to ensure absorption of hydrocarbon by the molecular sieve. Such hydrocarbons may subsequently be removed from the tape by heating, and portions of the tape may be selectively analyzed at high sensitivity by the use of associated equipment such as mass spectrometers, gas chromatographs, and the like.

What I claim is:

1. In a method of airborne geochemical prospecting wherein samples of atmospheric gases, vapours or particulates are collected and analyzed for content of predetermined elements or compounds, the improvement wherein contemporaneously with the collection of said samples, the atmosphere in the vicinity of the place of collection of said samples is monitored to determine whether the respective samples were uplifted by an updraft of air, and wherein samples respectively collected during periods of updrafts are separated from the remainder of said samples and are analyzed separately.

2. The invention as claimed in claim 1 wherein said samples comprise particulates.

3. The invention as claimed in claim 1 wherein said samples comprise particulates and wherein at least one of the following parameters of the atmosphere is monitored: temperature; humidity; vertical acceleration; particulate density; conductivity; radon concentration; and vertical atmospheric electric potential gradient.

4. The invention as claimed in claim 3 wherein said updrafts are sensed by monitoring a first of said parameters and a second of said parameters, wherein signals proportional in amplitude to said first and second parameters are derived electronically, and wherein said signals are multiplied together to produce a resultant signal which is indicative of the presence of updrafts.

5. The invention as claimed in claim 4 wherein said first parameter is temperature.

6. The invention as claimed in claim 4 wherein said first parameter is concentration of particulates.

7. The invention as claimed in claim 4 wherein said first parameter is vertical acceleration.

8. In an apparatus for airborne prospecting including means for collecting samples of atmospheric particulates, means for depositing said particulates on an elongated movable strip, and means for analyzing said stored particulates for content of predetermined elements or compounds, the improvement wherein there is provided means for deriving an electronic signal which is responsive in amplitude to at least one of the following parameters of the atmosphere near the place at which said particulates were collected: temperature; humidity; vertical acceleration; particulate density; conductivity; radon concentration; and vertical atmospheric electric potential gradient and wherein means controllable by said signal is provided for respectively directing particulates collected during periods of updrafts to positions on said strip which respectively are spaced-apart from the positions at which others of said samples are deposited.

9. The invention as claimed in claim 8 wherein said directing comprises a housing having a first chamber and a second chamber, said first and second chambers having inlets which are connected to said particulate collection means, and outlets which respectively are positioned near to said strip, said outlets being spaced-apart; a source of suction connected to said chambers through openings respectively formed therein; and means connected to said suction source and controllable by said electronic signal for selectively applying suction to one of said housing openings, whereby particulates collected during the period of an updraft flow through the outlet of said first chamber under the influence of said suction source and are deposited on said strip, and at other times other particulates flow through the outlet of said second chamber and are deposited on said strip at positions respectively spaced-apart from the respective positions on said strip of said first mentioned particulates.

10. The invention as claimed in claim 9 wherein said suction means is controllable by an electronic signal derived by multiplying together at least two electronic signals which respectively are proportional in amplitude to two of the said parameters.

* * * * *